(12) United States Patent
Karlsson

(10) Patent No.: US 11,951,796 B2
(45) Date of Patent: Apr. 9, 2024

(54) BUSHING FOR A SUSPENSION AND VEHICLE COMPRISING SUCH A BUSHING

(71) Applicant: Volvo Truck Corporation, Gothenburg (SE)

(72) Inventor: Viktor Karlsson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 358 days.

(21) Appl. No.: 17/390,899

(22) Filed: Jul. 31, 2021

(65) Prior Publication Data

US 2022/0048350 A1  Feb. 17, 2022

(30) Foreign Application Priority Data

Aug. 11, 2020  (EP) ..................................... 20190502

(51) Int. Cl.
*B60G 7/02*  (2006.01)
(52) U.S. Cl.
CPC .......... *B60G 7/02* (2013.01); *B60G 2204/143* (2013.01); *B60G 2204/41* (2013.01)
(58) Field of Classification Search
CPC . B60G 7/02; B60G 2204/143; B60G 2204/41
See application file for complete search history.

(56) References Cited

U.S. PATENT DOCUMENTS

| | | | |
|---|---|---|---|
| 3,572,677 A | 3/1971 | Damon | |
| 4,556,235 A * | 12/1985 | Giebel | F16F 1/387 267/221 |
| 6,176,501 B1 * | 1/2001 | Bartolone | B60G 7/02 280/86.756 |
| 7,360,756 B2 * | 4/2008 | Urquidi | B60G 7/02 267/281 |
| 7,364,176 B2 * | 4/2008 | Saitoh | F16F 1/3873 280/124.13 |
| 7,581,721 B2 * | 9/2009 | Kobayashi | F16F 1/3863 267/141.2 |
| 9,139,063 B2 * | 9/2015 | Yoshimi | B60G 17/02 |
| 9,186,945 B2 * | 11/2015 | Luttinen | B60G 3/04 |
| 9,751,370 B2 * | 9/2017 | Weifenbach | B62D 17/00 |
| 10,017,020 B2 * | 7/2018 | Andreasen | F16B 39/28 |
| 10,807,430 B2 * | 10/2020 | Babu | F16F 1/3842 |
| 10,899,186 B2 * | 1/2021 | Mleczko | B60G 7/008 |

(Continued)

FOREIGN PATENT DOCUMENTS

| | | |
|---|---|---|
| CN | 205853797 U | 1/2017 |
| EP | 1197358 A1 | 4/2002 |

(Continued)

OTHER PUBLICATIONS

Extended European Search Report for European Patent Application No. 20190502.3, dated Dec. 23, 2020, 7 pages.

*Primary Examiner* — Tara Schimpf
*Assistant Examiner* — Matthew J Sullivan
(74) *Attorney, Agent, or Firm* — Withrow & Terranova, PLLC

(57) ABSTRACT

A bushing for a wheel suspension adapted to connect a control bar to a structure of a vehicle, where the bushing comprises a first rotational center for the control bar having a first angular rotation range, where the bushing comprises a second rotational center for rotational angles outside of the first angular rotation range.

9 Claims, 3 Drawing Sheets

(56) References Cited

U.S. PATENT DOCUMENTS

| | | | | |
|---|---|---|---|---|
| 11,052,721 | B2* | 7/2021 | Kuwayama | B60G 21/055 |
| 11,135,891 | B2* | 10/2021 | Matsushita | B60G 21/0551 |
| 11,299,003 | B2* | 4/2022 | Kim | B60G 7/001 |
| 11,407,267 | B2* | 8/2022 | Bark | B60G 11/38 |
| 11,485,187 | B1* | 11/2022 | Edren | B60G 17/027 |
| 11,511,582 | B2* | 11/2022 | Zimmerman | B60G 7/02 |
| 2006/0220638 | A1* | 10/2006 | Urquidi | G01D 5/145 |
| | | | | 324/207.2 |
| 2009/0249581 | A1 | 10/2009 | Bost, Jr. | |
| 2013/0175748 | A1* | 7/2013 | Otsu | F16F 1/38 |
| | | | | 267/292 |
| 2021/0309066 | A1* | 10/2021 | Nishimura | F16F 1/3863 |
| 2023/0124438 | A1* | 4/2023 | Lee | B60G 7/02 |
| | | | | 267/153 |

FOREIGN PATENT DOCUMENTS

| | | |
|---|---|---|
| JP | H05104922 A | 4/1993 |
| JP | H08320041 A | 12/1996 |
| KR | 20130091607 A | 8/2013 |

\* cited by examiner

BUSHING FOR A SUSPENSION AND VEHICLE COMPRISING SUCH A BUSHING

RELATED APPLICATIONS

The present application claims priority to European Patent Application No. 20190502.3, filed on Aug. 11, 2020, and entitled "BUSHING FOR A SUSPENSION AND VEHICLE COMPRISING SUCH A BUSHING," which is incorporated herein by reference in its entirety.

TECHNICAL FIELD

The present invention relates to a bushing that allows for a variable suspension geometry in a heavy vehicle.

BACKGROUND

Vehicles, both passenger cars and heavy vehicles, are provided with different stays and control bars in order to stabilize the wheel suspension and to limit wheel travel in unwanted directions. Examples of such stays are, e.g., anti-roll bars that are adapted to limit sideways roll of the vehicle when cornering. The anti-roll bar will increase the torsional stiffness of the suspension. The anti-roll bar is attached to the vehicle through stays, struts, or link bars, where one end of the link bar is attached to the frame of the truck, and one end of the link bar is attached to the anti-roll bar. Another example is reaction stays that are adapted to transfer acceleration forces and braking forces from the wheels to the frame of the truck.

The control bars may be attached to the suspension parts and the structural parts of the vehicle frame with either bearings of different types, such as roller bearings or sliding bearings, or by rubber bushings. The stiffness of a rubber bushing may vary, depending on the forces and the direction of the forces that will act on the bushing. Some rubber bushings act more as a sliding bearing, and some bushings will be more resilient.

In a traditional wheel suspension system, using traditional rubber bushings to attach stays and control bars, the stays and control bars have a fixed length. Depending on the amount of wheel travel, a fixed control arm may give rise to a too large wheel track width change, e.g., when a heavy vehicle is fully loaded and drives on an uneven road.

There is thus room for an improved bushing for a wheel suspension.

SUMMARY

An object of the invention is, therefore, to provide an improved bushing that allows for a variable suspension geometry. A further object of the invention is to provide a vehicle comprising such a bushing.

The solution to the problem is described regarding the bushing and the vehicle. Other features contain advantages and further developments of the bushing.

In a bushing for a wheel suspension adapted to connect a control bar to a structure of a vehicle, the bushing comprises a first rotational center for the control bar having a first angular rotation range. The object of the invention is achieved in that the bushing comprises a second rotational center for rotational angles outside of the first angular rotation range.

By this first embodiment of a bushing, the bushing allows for a variable suspension geometry for a vehicle. A control arm will rotate around a first rotational center in a first angular rotation range. The first angular rotation range consists of the smaller rotation angles, e.g., 10-20 degrees, and is the nominal design range for the suspension of the vehicle under normal load conditions, e.g., when the vehicle is not fully loaded or drives on a smooth road. When the suspension is under more stress, e.g., when the vehicle is fully loaded and/or drives on a rough road, the rotation of the control bar will exceed the first angular rotation range. During this condition, the control bar will rotate around the second angular rotation range. A further advantage is that the working length of the control bar can be extended when, e.g., a loading operation such as raising the fifth wheel to decouple a trailer or when handling a swap body is to be performed.

In one example, the first rotational center is arranged closer to an outer end of the control bar than the second rotational center. In this way, the rotation around the second rotational center will provide a virtual control bar that is longer than the actual control bar. In another example, the second rotational center is arranged closer to the outer end of the control bar than the first rotational center. In this way, the rotation around the second rotational center will provide a virtual control bar that is shorter than the actual control bar. By providing two different rotational centers, the bushing will be able to alter the active length of the control bar depending on the load acting on the suspension, such that, e.g., the camber angle, the caster angle, or the toe-in characteristics can be changed depending on the load. This may, for example, be used to limit wheel travel at high loads, but at the same provide a normal wheel travel at normal loads, without having to compromise the vehicle handling at normal loads with respect to the vehicle handling at higher loads.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
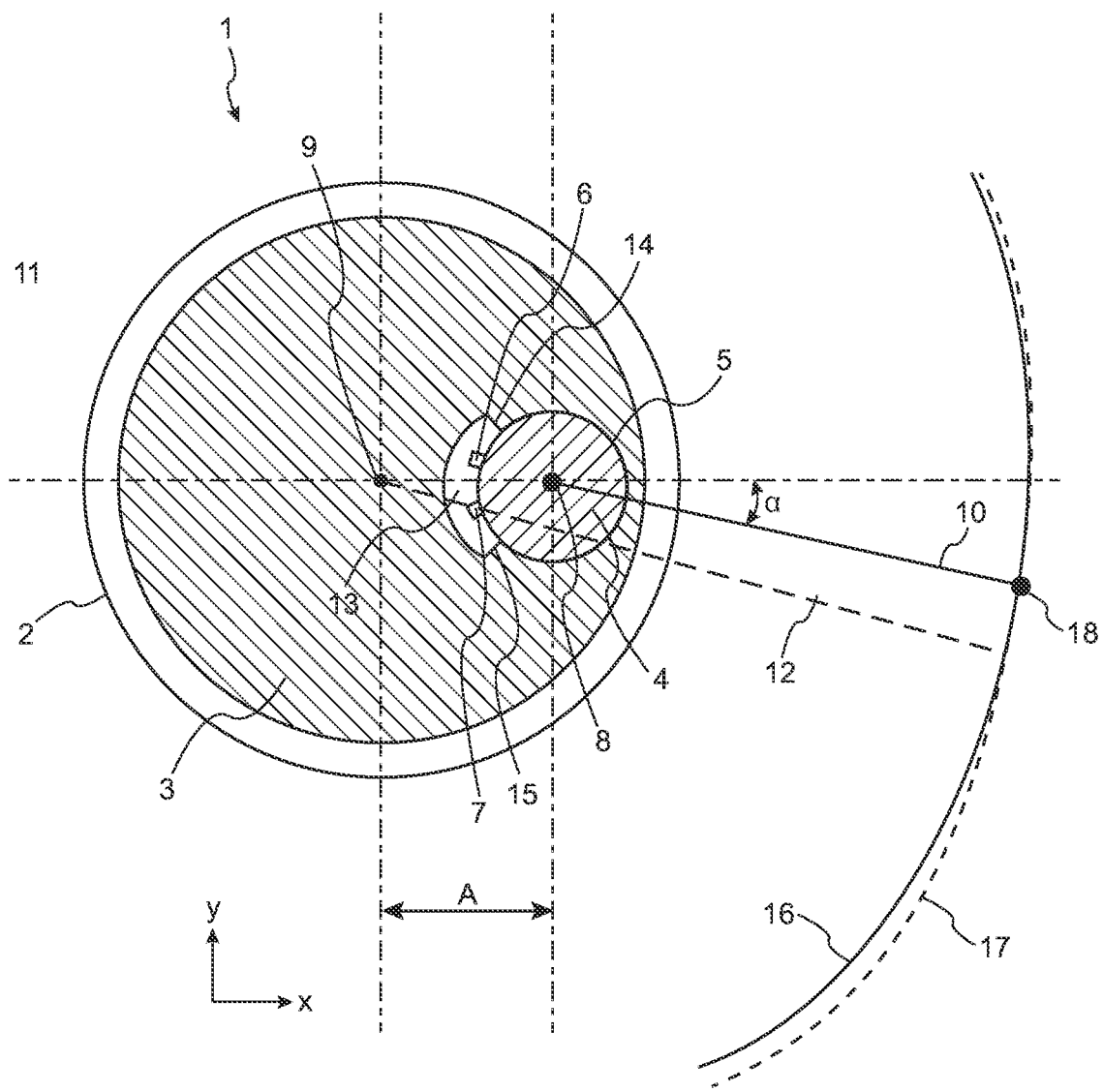
FIG. 1 shows a schematic view of a first example of a bushing according to the invention.

FIG. 1 shows an example of a bushing 1. The bushing is provided with an outer casing 2, preferably a circular metal sleeve. The bushing is adapted to be attached to a structural part 11 of the vehicle, e.g. the frame or a bracket attached to the frame. The bushing will be attached to the structural part in a fixed way, e.g. by a clamp, such that the bushing will not be able to rotate. The outer casing will prevent the bushing from being deformed when it is clamped to the structural part. The bushing further comprises a body 3, made from a resilient material such as rubber or plastic. The stiffness of the body depends on the vehicle and on the loads that will act on the bushing, but a relatively rigid material is preferred. The body is preferably attached to the outer casing in a fixed manner, such that the body can not rotate in the outer casing.

The bushing is, e.g., attached to a vehicle frame at a wheel suspension. In the shown example, the x-direction is parallel to a horizontal direction running from side to side of the vehicle, and the y-direction is the vertical direction from ground up. The bushing may also be arranged in other directions with regard to the frame of the vehicle, depending on the actual needs.

The bushing is also provided with an inner bar 4, which is a metal part suspended in the bushing. The inner bar may either be a short shaft arranged in the bushing to which a control bar of some kind is attached, e.g., by splines. The inner bar may also be one end of a control bar 10 of some kind, e.g., a control bar or a reaction rod in a vehicle suspension. The inner bar may also be part of, e.g., an anti-roll bar. The inner bar 4 is suspended in the body 3 in a rotational manner, such that the inner bar can rotate with respect to the body. Between the body and the inner bar, a low friction material may be applied in order to reduce friction between the body and the inner bar. The low friction material may be applied to, e.g., the inner bar or the body, or may be a sleeve made from or treated with a low friction material. The outer end 18 of the control bar 10 is attached to a moving part of the vehicle, e.g., a wheel suspension or another part of the vehicle that will be moving with respect to the frame of the vehicle.

The inner bar is provided with a first rotational stop 6 and a second rotational stop 7. In the example shown in FIG. 1, the rotational stops are arranged at the inside of the inner arm, close to the center of the body. The rotational stops may, however, be arranged at any position of the inner arm. The rotational stops are either machined to the inner arm or are attached to the inner arm in a fixed manner. The rotational stops run in a cut-out 13 in the body 3. The angular extension of the cut-out corresponds to a first angular rotation range of the control bar. The cut-out comprises a first bearing surface 14 and a second bearing surface 15. The first bearing surface is adapted to cooperate with the first rotational stop 6, and the second bearing surface 15 is adapted to cooperate with the second rotational stop 7. The bearing surfaces may, e.g., comprise a metal insert that is fixed to the body. The first rotational stop and the second rotational stop may also be conceived in other ways. The rotational stops may, e.g., be arranged on the inner bar outside of the body with stop members arranged on outer sides of the body. The rotational stops may also be suspended to the body through resilient means such as coil springs that will cause the control bar to rotate around the second rotational center when a coil spring is completely compressed.

Under normal load conditions, the control bar 10 will rotate around the first rotational center 8, which is at the center of the inner bar 10, with an angle α. The outer end 18 of the control bar will follow a first rotational path 16. When the load on the wheel suspension exceeds a predefined value, one of the rotational stops will hit one of the bearing surfaces. When, e.g., the first bearing surface 14, the rotation of the control bar around the first rotational center 8 is prohibited. Instead, the control bar will start to rotate around the second rotational center 9, which is at the center of the body 3. The distance between the first rotational center 8 and the second rotational center 9 is denoted A. Since the body 3 is fixedly attached to the outer casing 2, which in turn is fixed to the structural part of the vehicle, the rotation around the second rotational center is through deformation of the body. The distance between the second rotational center 9 and the outer end of the control bar 18 will correspond to a virtual control bar 12. In the shown example, the virtual control bar 12 is longer than the actual control bar 10. With the virtual control bar, the outer end 18 of the control bar will follow a second rotational path 17.

In this way, the characteristics of, e.g., the wheel suspension will change when the load exceeds a predefined value. It is, e.g., possible to let the suspension stiffen when the load exceeds the predefined value, such that the vehicle may have a relatively soft suspension under normal loads and a stiffer suspension when higher forces acts on the wheel suspension. In another example, the wheel track width may be limited when the load exceeds the predefined value.

Figure 2:
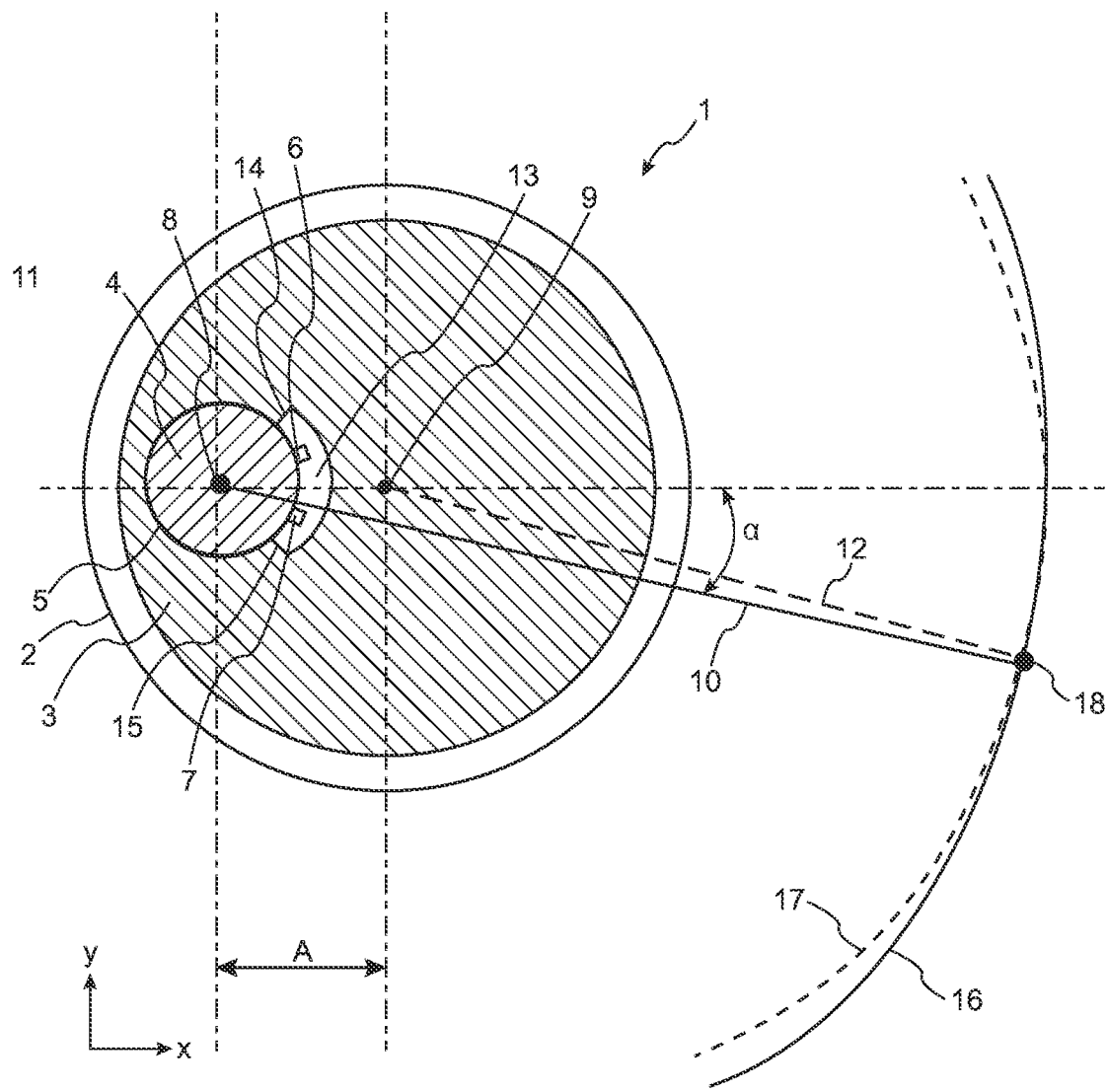
FIG. 2 shows a schematic view of a second example of a bushing according to the invention.
Figure 3:
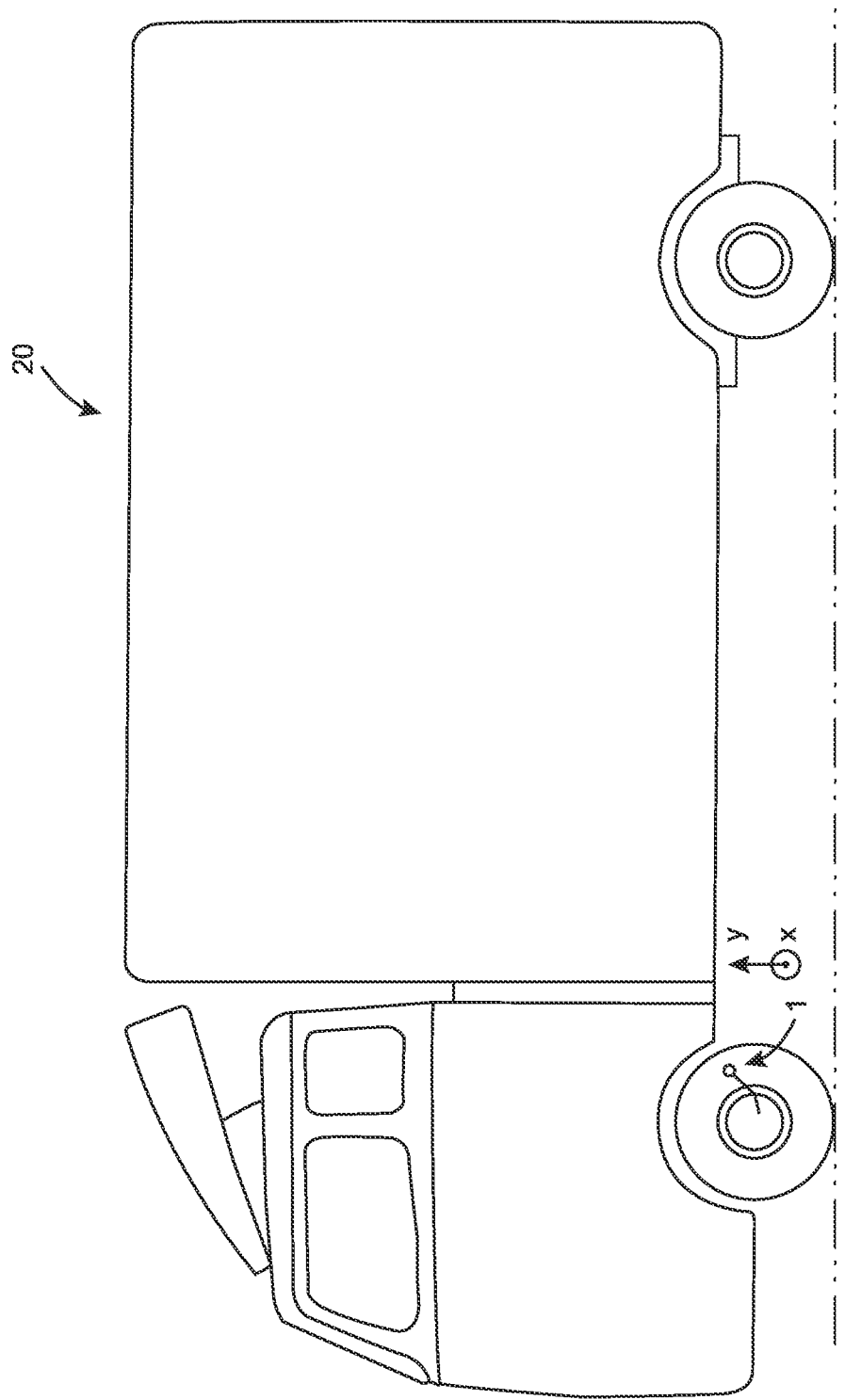
FIG. 3 shows a schematic vehicle according to the invention.

In another example, shown in FIG. 2, the first rotational center 8, and thus the inner bar 5, are arranged at the other side of the second rotational center 9, with the second rotational center 9 closer to the outer end 18 of the control bar 10. The distance between the second rotational center 9 and the first rotational center 8 is denoted A. The rotational stops 6, 7 are in this example facing the second rotational center 9 but can be directed in any direction. Here, under normal load conditions, the control bar 10 will rotate around the first rotational center 8, which is at the center of the inner bar 10. The outer end 18 of the control arm will follow the first rotational path 16. When the load on the wheel suspension exceeds a predefined value, one of the rotational stops will hit one of the bearing surfaces. When, e.g., the first rotational stop 6 hits the first bearing surface 14, the rotation of the control arm 10 around the first rotational center 8 is prohibited. Instead, the control bar will start to rotate around the second rotational center 9, which is at the center of the body 3. The distance between the second rotational center 9 and the outer end of the control bar 18 will correspond to a virtual control bar 12. In this example, the virtual control bar 12 is shorter than the actual control bar 10. With the virtual control bar, the outer end 11 of the control bar will follow the second rotational path 17.

It is also possible to position the first rotational center 8 at other positions relative to the second rotational center 9, i.e., to mount the inner bar in the body at other positions. It is, e.g., possible to position the inner bar above or below the second rotational center or at other angles, depending on the requirements. The size and stiffness of the bushing may also be determined in dependency of the requirements, as well as the distance between the first rotational center and the second rotational center.

The invention is not to be regarded as being limited to the embodiments described above, a number of additional variants and modifications being possible within the scope of the subsequent patent claims.

The invention claimed is:

1. A bushing for a wheel suspension adapted to connect a control bar to a structure of a vehicle, the bushing comprising:
    a body,
    a first rotational center for the control bar having a first angular rotation range,
    a second rotational center for rotational angles outside of the first angular rotation range, and
    a first rotational stop and a second rotational stop arranged to limit the angular rotation of the control arm to the first angular rotation range;
    wherein the first rotational stop and the second rotational stop positioned within a cut-out in the body of the bushing.

2. The bushing of claim 1, wherein the bushing comprises an outer casing and an inner bar.

3. The bushing of claim 2, wherein the first rotational stop and the second rotational stop are arranged on the inner bar.

4. The bushing of claim 2, wherein the body is made from rubber or plastic.

5. The bushing of claim 2, wherein the body is fixedly attached to the outer casing.

6. The bushing of claim 2, wherein the bushing comprises a low friction material arranged between the body and the inner bar.

7. The bushing of claim 1, wherein the first rotational center is arranged closer to an outer end of the control bar than the second rotational center, such that rotation around the second rotational center will provide a virtual control bar that is longer than the control bar.

8. The bushing of claim 1, wherein the second rotational center is arranged closer to an outer end of the control bar than the first rotational center, such that rotation around the second rotational center will provide a virtual control bar that is shorter than the control bar.

9. A vehicle, comprising:
 a bushing for a wheel suspension adapted to connect a control bar to a structure of the vehicle, the bushing comprising:
  a body,
  a first rotational center for the control bar having a first angular rotation range,
  a second rotational center for rotational angles outside of the first angular rotation range, and
  a first rotational stop and a second rotational stop arranged to limit the angular rotation of the control arm to the first angular rotation range;
 wherein the first rotational stop and the second rotational stop positioned within a cut-out in the body of the bushing.

\* \* \* \* \*